United States Patent
Hamel et al.

(10) Patent No.: US 12,485,218 B2
(45) Date of Patent: Dec. 2, 2025

(54) METHOD OF STERILIZING MEDICAL DEVICE

(71) Applicant: Duoject Medical Systems Inc., Bromont (CA)

(72) Inventors: Simon Hamel, Knowlton (CA); Mathieu Viens, Granby (CA)

(73) Assignee: DUOJECT MEDICAL SYSTEMS INC., Bromont (CA)

( * ) Notice: Subject to any disclaimer, the term of this patent is extended or adjusted under 35 U.S.C. 154(b) by 0 days.

(21) Appl. No.: 17/803,670

(22) PCT Filed: Apr. 1, 2021

(86) PCT No.: PCT/CA2021/000027
§ 371 (c)(1),
(2) Date: Sep. 30, 2022

(87) PCT Pub. No.: WO2021/195741
PCT Pub. Date: Oct. 7, 2021

(65) Prior Publication Data
US 2023/0338640 A1    Oct. 26, 2023

(30) Foreign Application Priority Data

Apr. 3, 2020    (CA) ..................... 3077844

(51) Int. Cl.
*A61M 5/00*    (2006.01)
*A61L 2/20*    (2006.01)

(52) U.S. Cl.
CPC ............... *A61M 5/001* (2013.01); *A61L 2/20* (2013.01); *A61L 2202/24* (2013.01)

(58) Field of Classification Search
CPC .... A61L 2202/24; A61L 2/20; A61L 2202/13; A61M 5/001; A61M 5/24; A61M 2005/2403; A61M 5/2422; A61M 2209/10; A61M 2005/3267
See application file for complete search history.

(56) References Cited

U.S. PATENT DOCUMENTS

| 2005/0038391 A1 | 2/2005 | Wittland et al. |
| 2007/0073232 A1* | 3/2007 | Pickhard ............ A61M 5/2033 604/134 |
| 2019/0358401 A1 | 11/2019 | Cowe et al. |

FOREIGN PATENT DOCUMENTS

CA    2948003 A1    12/2015

OTHER PUBLICATIONS

Finkiel, Mario, "EtO—Ethylene Oxide Sterilization", 2013 (Year: 2013).*

(Continued)

*Primary Examiner* — Dung T Ulsh
*Assistant Examiner* — Nelson Louis Alvarado, Jr.
(74) *Attorney, Agent, or Firm* — MEDLER FERRO WOODHOUSE & MILLS PLLC

(57) ABSTRACT

A method of sterilizing a cartridge that has a side wall and a medicant in the cartridge. The cartridge is placed within an outer sleeve and the outer sleeve is sealed to the side wall of the cartridge with a wiper seal to form a hermetic microbial barrier. A breathable microbial membrane is provided over one end of the sleeve. The cartridge and the outer sleeve are subjected to gas sterilization in a sterilization chamber. Any sterilizing gas remaining after sterilization is removed.

11 Claims, 11 Drawing Sheets

(56) References Cited

OTHER PUBLICATIONS

International Search Report for International Application No. PCT/CA2021/000027, Mailing Date: Jun. 17, 2021.
Groß et al., Facilitating the sterilization of pre-filled syringes by two-step needle shield, Drugs Made in Germany 36(2): 65-67, 1993.

* cited by examiner

METHOD OF STERILIZING MEDICAL DEVICE

CROSS-REFERENCE TO RELATED APPLICATION

The present application is a 371 of PCT/CA2021/000027, filed Apr. 1, 2021, and claiming priority to CA3077844, filed Apr. 3, 2020.

FIELD OF THE INVENTION

The present invention relates to sterilization and more particularly, relates to a process for gas sterilization of medical devices.

BACKGROUND OF THE INVENTION

The use of sterilization is widely known and practised. Many different processes are used for sterilizing medical devices and pharmaceutical products including, for example, radiation, chemical sterilization, dry heat sterilization and steam sterilization.

Radiation sterilization using gamma or electron beam radiation is one method which is widely used. This type of sterilization process is most desirable when heat sensitive plastic or other materials are involved. However, a downside of this process is that it could cause cosmetic discolouration and can also affect various materials used in medical devices.

It is also known to use gases such as ethylene oxide as many materials such as plastics can withstand exposure to the ethylene oxide gas without affecting the device's ability to properly function. Problems associated with the ethylene oxide method are the fact that it is toxic to humans and also that it can be reactive at low temperatures and it is necessary to ensure that the gas is thoroughly removed from the product.

Dry heat sterilization can be used for devices which are heat resistant but which are susceptible to water damage. A problem with such a method is the length of time and the relatively high temperature required for the heat to be effective in removing all contaminants.

Steam sterilization can be used on devices which use stable heat resistant materials. It is relatively quick compared to dry heat sterilization. However, water droplets can corrode materials that are not resistant to water contact.

SUMMARY OF THE INVENTION

It is an object of the present invention to provide a gas sterilization process which is relatively inexpensive and can be applied to sterilize a device which is designed to be used as part of a further device.

According to one aspect of the present invention, there is provided a method of sterilizing a cartridge, the cartridge having a side wall and a medicant therein, placing the cartridge within an outer sleeve sealing the sleeve in the side wall of the cartridge with a wiper seal to form a hermetic microbial barrier, providing a breathable microbial membrane over one end of the sleeve, subjecting the cartridge and the outer sleeve to a gas sterilization, and removing any sterilizing gas remaining after sterilization.

According to a further embodiment of the present invention, there is provided a sterilization arrangement comprising an enclosed space, a cartridge having a side wall, a piston at a first end of the cartridge and a septum at a second end thereof, a medicant within the cartridge, a sleeve extending about the cartridge, a needle hub, a needle having a first piercing tip and a second piercing tip, the needle being mounted in the needle hub, the first piercing tip being located proximate the septum and the second piercing tip being located proximate an end of the sleeve, a wiper seal between the side wall of the cartridge and the sleeve, the wiper seal forming a hermetic seal, a pierceable breathable microbial membrane extending across the sleeve proximate the second piercing tip, and means for filling the enclosed space with a sterilizing gas.

In practising the method of the present invention, there is a conventional type cartridge which will have a cartridge piston or plunger as is well known in the art. At the other end, the cartridge will include a neck portion which has a septum located therein. The septum is designed to be pierced by a needle to gain access to the medicant in the cartridge. Naturally, the medicant may be any conventional material or drug.

A cartridge sleeve is provided to extend about at least a portion of the cartridge. Conventionally, the cartridge is of a cylindrical configuration although if desired, other configurations could be utilized. The cartridge sleeve will extend about the neck portion having the septum and at least part way down the side wall of the cartridge. The cartridge also has a wiper seal which is designed to hermetically seal the gap between the cartridge and the cartridge sleeve. Typical materials for the wiper seal would be various elastomeric materials like TPE and silicone.

The arrangement will also include a needle hub which has a needle mounted therein. The needle has a first piercing tip which will be located adjacent the septum of the cartridge with the second piercing tip extending outwardly into the cartridge sleeve. A coil spring is mounted within the cartridge sleeve between the neck of the cartridge and the end of the sleeve. Finally, there is provided a porous breathable and pierceable membrane extending over the end of the cartridge sleeve. Materials such as Tyvek™ which is a polyethylene fiber membrane may be utilized.

Before sterilizing, the cartridge and associated components are placed in a container or sterilization chamber into which a sterilizing gas such as ethylene oxide is utilized. This step is well known in the art.

During the sterilization, the sterilizing gas is free to move through the porous membrane to the interior of the sleeve and there is provided a gas passageway to permit the gas to pass up to the wiper seal. This will ensure a complete sterilization of the critical components.

Following sterilization, the sterilizing gas is removed, typically by vacuum, and the cartridge is then ready to be used. During the use thereof, a plunger rod is attached to the piston and may then be used to provide an injection through a sterile fluid path.

DETAILED DESCRIPTION OF THE INVENTION

Figure 1:
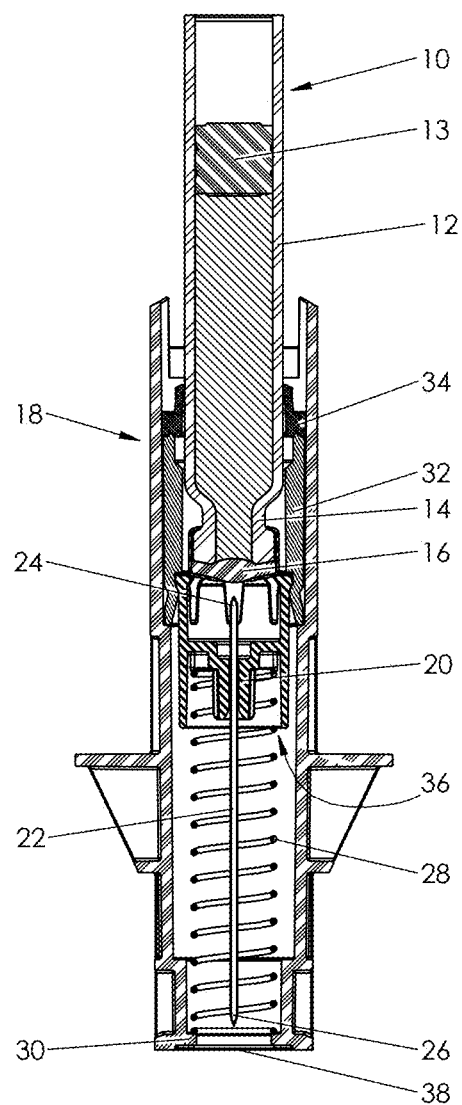
FIG. 1 is a side sectional view of a sterilization arrangement according to an embodiment of the present invention.
Figure 2:
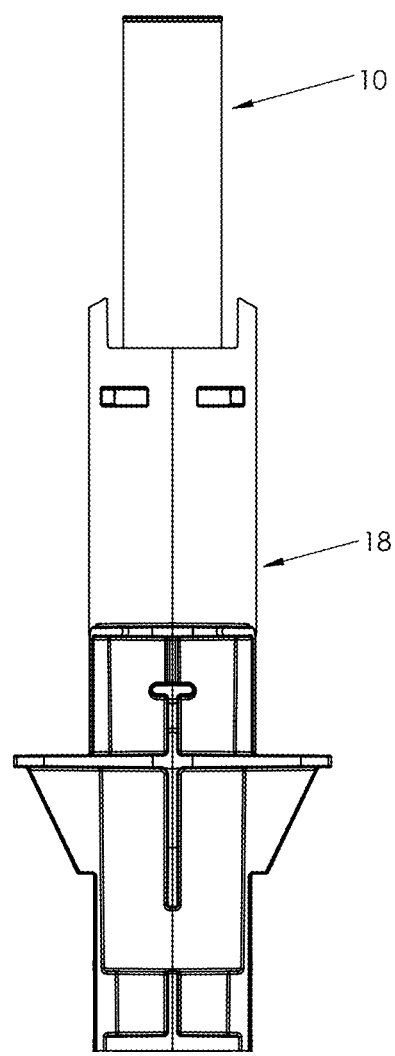
FIG. 2 is side elevational view thereof.
Figure 3:
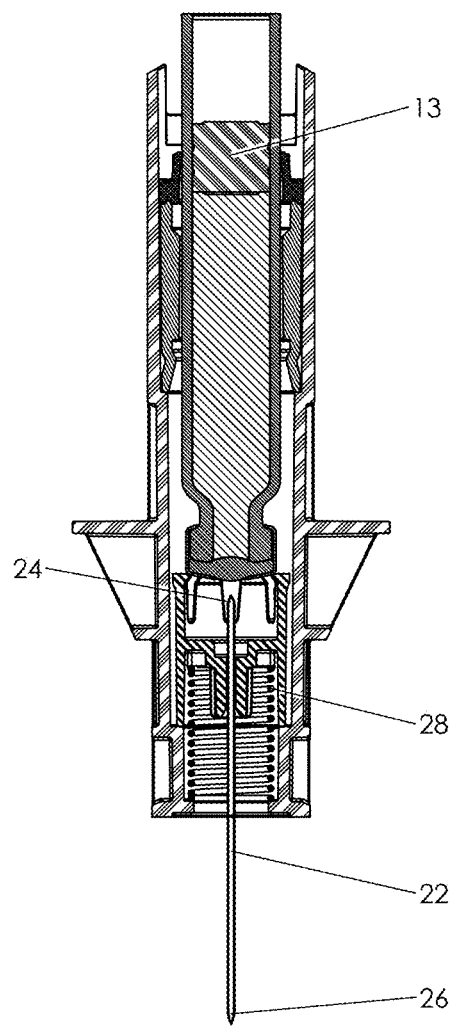
FIG. 3 is a sectional view showing operation of the device during the needle extension phase.
Figure 4:
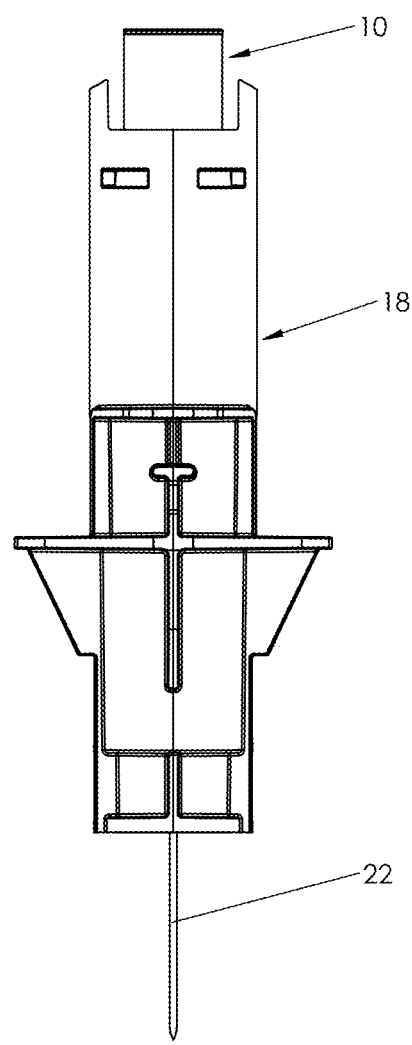
FIG. 4 is a side elevational view thereof.
Figure 5:
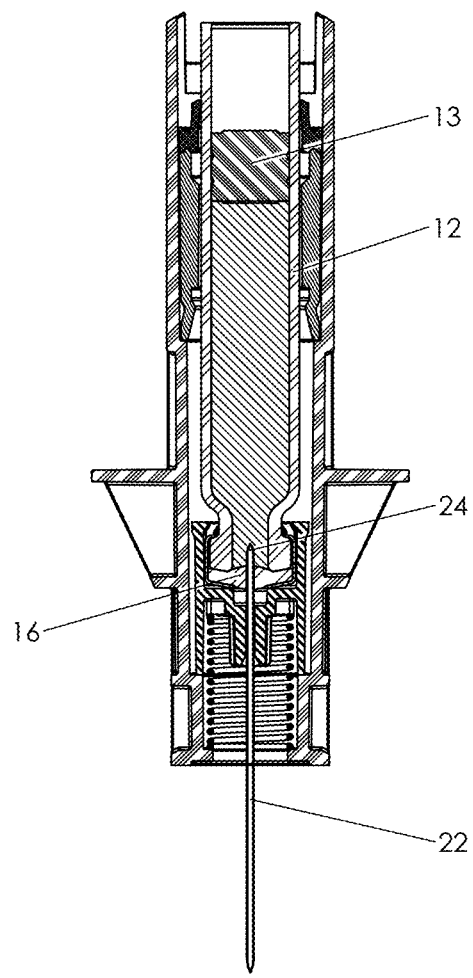
FIG. 5 is a sectional view illustrating piercing of the cartridge.
Figure 6:
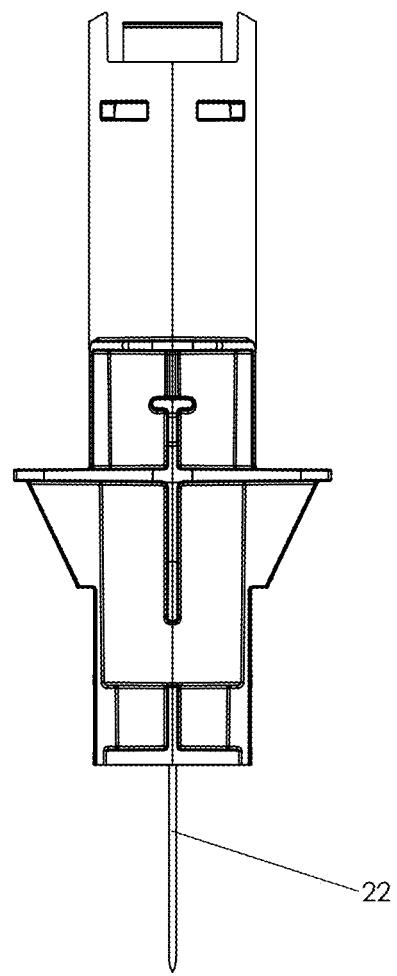
FIG. 6 is a side elevational view thereof.
Figure 7:
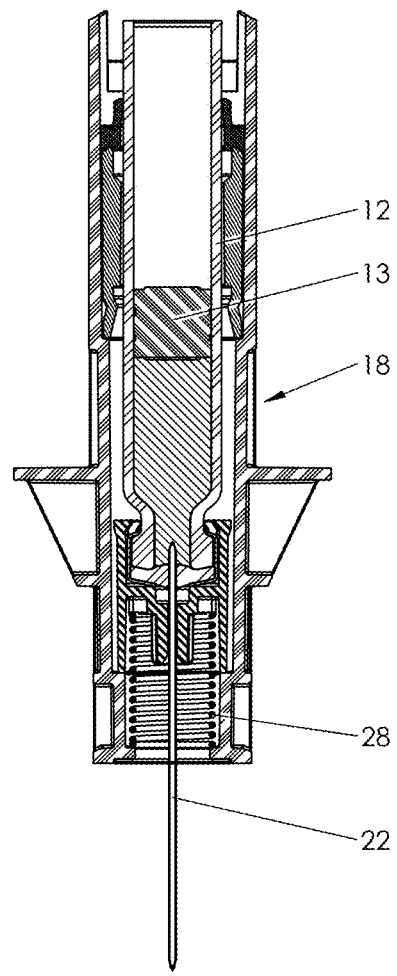
FIG. 7 is a sectional view illustrating the arrangement during an injection.
Figure 8:
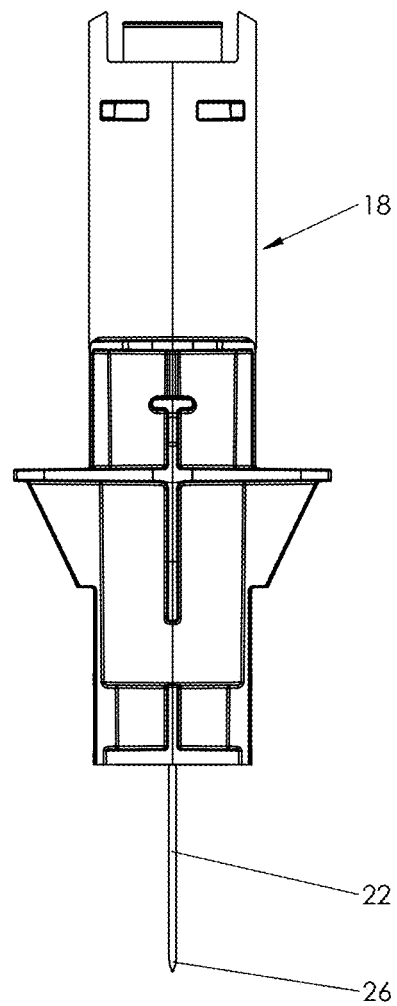
FIG. 8 is a side elevational view thereof.
Figure 9:
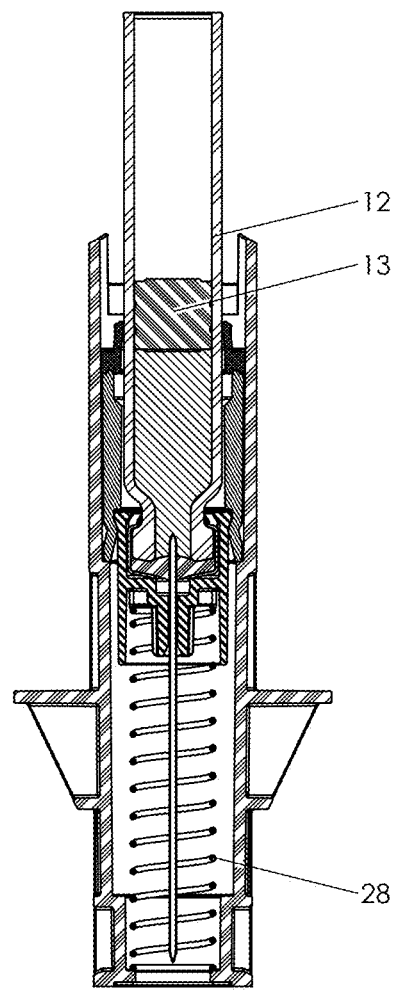
FIG. 9 is a sectional view illustrating retraction of the needle within the cartridge sleeve.
Figure 10:
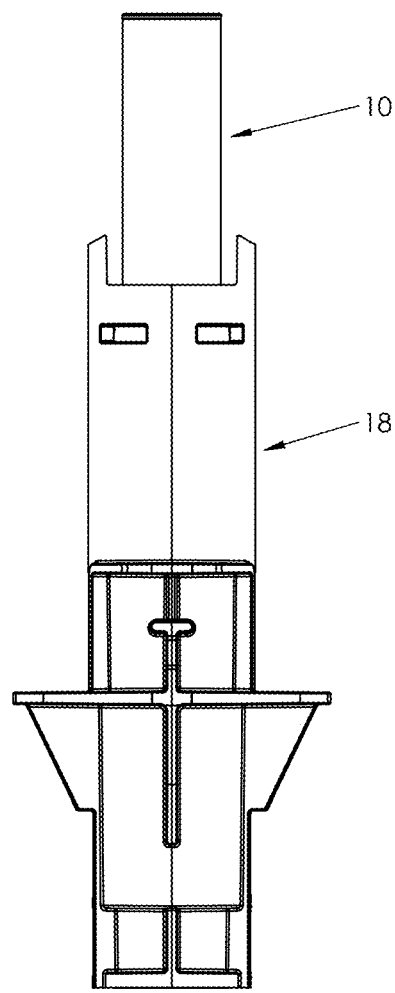
FIG. 10 is a side elevational view thereof.
Figure 11:
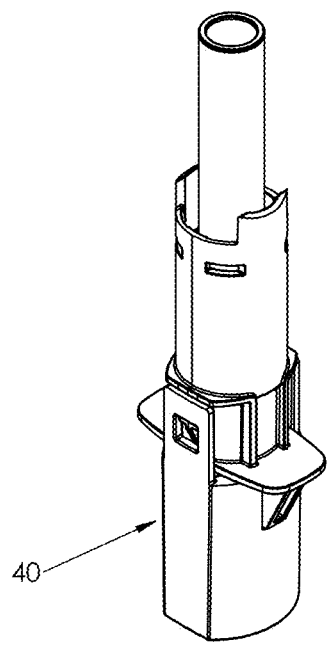
FIG. 11 is a perspective view thereof with a cap.

Referring to the drawings in greater detail and by reference characters thereto, there is illustrated a cartridge which is generally designated by reference numeral 10. Cartridge 10 is substantially conventional and has a side wall 12 which defines a cylindrical configuration. At one end of cartridge 10, there is provided a neck 14. Neck 14 includes a pierceable septum 16. At the other end of cartridge 10, there is provided a conventional piston 13.

Extending about cartridge 10 is a cartridge sleeve or holder generally designated by reference numeral 18.

A needle hub 20 is mounted in operative relationship with respect to cartridge 10. Needle hub 20 includes a needle 22 extending therethrough and having a first piercing tip 24 and a second piercing tip 26. A coil spring 28 abuts the needle hub 20 and also abuts a ledge 30 formed at the end of sleeve 18.

Interposed between sleeve 18 and cartridge side wall 12 is a sleeve washer 32. There is also included a wiper seal 34 which seals off all air passageways between sleeve 18 and side wall 12. Wiper seal 34 forms a hermetic microbial barrier and could typically be made of elastomeric materials like TPE and silicon.

As may be seen in the drawings, there is provided gas passageway 36 which will permit a sterilizing gas to pass and sterilize the upper area of cartridge 12 including neck 14.

At the end of sleeve 18, there is provided a breathable microbial barrier which will permit the passage of a sterilizing gas therethrough while also preventing the entry of any microbial material. The breathable barrier may be made of a polyethelene fiber membrane such as Tyvek™.

After sterilization, the sterilizing gas is removed. This could be by vacuum or equivalent methods.

Subsequently, a membrane cap 40 may be optionally placed over a sleeve and cartridge end.

It will be understood that the above described embodiments are for purposes of illustration only and that changes and modifications may be made thereto without departing from the spirit and scope of the invention.

The invention claimed is:

1. A method of sterilizing a cartridge, said cartridge having a side wall and a medicant therein, the method comprising:
    placing said cartridge within an outer sleeve of a sterilization arrangement;
    sealing said outer sleeve to said side wall of said cartridge with a wiper seal to form a hermetic microbial barrier;
    providing a breathable microbial membrane over one end of said outer sleeve;
    providing a gas passageway between said breathable microbial membrane and said wiper seal to permit sterilizing gas to pass through said breathable microbial membrane to said wiper seal;
    subjecting said cartridge and said outer sleeve to a gas sterilization; and
    removing any sterilizing gas remaining after the gas sterilization.

2. The method of claim 1 further including a step of covering said breathable microbial membrane with a cap.

3. The method of claim 1 wherein subjecting said cartridge and said outer sleeve to the gas sterilization comprises a step of subjecting said cartridge and said outer sleeve to ethylene oxide.

4. The method of claim 1, wherein said sterilization arrangement further includes a needle having a first piercing tip and a second piercing tip; and
    wherein the step of placing said cartridge within said outer sleeve includes placing a septum of the cartridge proximate the first piercing tip.

5. The method of claim 4, wherein the step of providing said breathable microbial membrane over the end of said outer sleeve includes providing said breathable microbial membrane proximate said second piercing tip.

6. A sterilization arrangement comprising:
    a sterilization chamber;
    a cartridge having a side wall, a piston at a first end of said cartridge and a septum at a second end of the cartridge, a medicant within said cartridge, and a sleeve extending about said cartridge;
    a needle hub;
    a needle having a first piercing tip and a second piercing tip, said needle being mounted in said needle hub, said first piercing tip being located proximate said septum and said second piercing tip being located proximate an end of said sleeve;
    a wiper seal between said side wall of said cartridge and said sleeve, said wiper seal forming a hermetic seal; and
    a pierceable breathable microbial membrane extending across the end of said sleeve proximate said second piercing tip; and
    a gas passageway between said breathable microbial membrane and said wiper seal to permit a sterilizing gas to pass through said breathable microbial membrane to said wiper seal.

7. The sterilization arrangement of claim 6, further comprising the sterilizing gas for utilization in the sterilizing chamber.

8. The sterilization arrangement of claim 6, further comprising a coil spring mounted between said needle hub and the end of the sleeve.

9. The sterilization arrangement of claim 8, wherein the coil spring extends from the needle hub to the second piercing tip and abuts a ledge at the end of said sleeve.

10. The sterilization arrangement of claim 6, wherein said first piercing tip is arranged to pierce said septum and said second piercing tip is arranged to pierce said breathable microbial membrane.

11. A method of sterilizing a cartridge comprising:
    providing a sterilization arrangement according to claim 6;
    subjecting said cartridge and said sleeve of said sterilization arrangement to a gas sterilization; and
    removing any sterilizing gas remaining after the gas sterilization.

* * * * *